Patented July 5, 1949

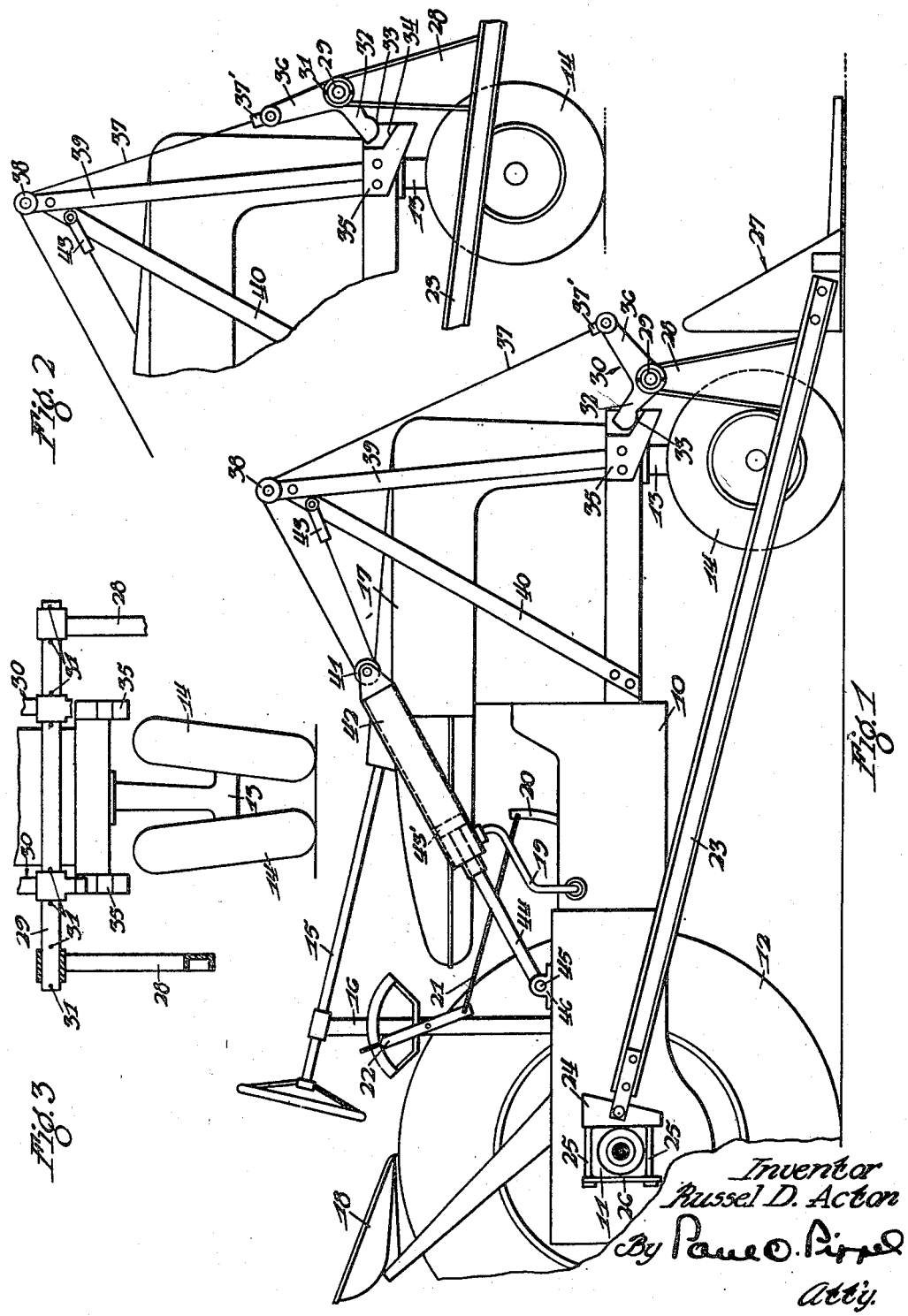

2,474,998

UNITED STATES PATENT OFFICE 2,474,998

TRACTOR LOADER

Russel D. Acton, Chicago, Ill.

Application December 21, 1946, Serial No. 717,738

8 Claims. (Cl. 214—131)

This invention relates to a tractor mounted loader. More specifically, it relates to a loading device having an initial force amplifying construction.

For general farm use, particularly for loading manure, it has been found desirable to mount loaders directly on tractors. These loaders have been mounted to a great extent on tricycle type tractors as such tractors are more widely used on farms. The design of a tricycle tractor makes its necessary to have relatively small closely spaced wheels at the front end. Such a construction serves admirably for the mounting of a loader of the type in which side frame members are pivotally connected to the rear of the tractor and extend along the sides of the tractor body spaced a sufficient distance from the front wheels to permit steering of the front wheels. It is desirable to have a tractor mounted loader which raises at a relatively fast rate with a minimum application of power such as may be obtained from a tractor mounted fluid pump and a hydraulic cylinder. It is also highly essential, however, to have an initial lifting force sufficient to break the material being loaded loose from the ground, particularly when it is frozen or matted together such as to require a breaking away force substantially greater than the lifting force.

The principal object of the present invention is to provide a tractor mounted loader with an initial force amplifying mechanism.

A more specific object is to provide a cable type loader lifting mechanism with a lever system acting initially to amplify the force applied to a loader.

These objects and others which will be apparent from the detailed description to follow are attained by a construction such as shown in the drawings, in which:

Figure 1 is a side elevation of an agricultural tractor with a loader embodying the invention mounted thereon, the inner wheel of the tractor being removed to better show the operating parts of the loader.

Figure 2 is a portion of the forward end of the tractor and loader assembly shown in Figure 1 with the loader in partially raised position; and Figure 3 is a front end view of a portion of the tractor and loader shown in Figure 2.

The tractor shown has a narrow body 10, laterally extending rear axle housings 11, one of which is visible in Figure 1, traction wheels 12, one of which shows in Figure 1, a front steerable column or support 13, and a pair of spaced steerable front wheels 14. A steering column 15 carried by a support 16, a radiator hood and fuel tank super-structure 17 and an operator's seat 18 are also shown as being a part of the tractor. This tractor is of the conventional tricycle type widely used on farms at the present time. Such tractors are quite often provided with a hydraulic mechanism of conventional construction utilizing a pump driven by the engine of the tractor from which fluid is supplied through a conduit such as the conduit 19 shown in the drawings. The delivery of fluid may be controlled by a valve mechanism of any conventional type controlled by a lever 20 connected by a rod 21 to a manual control lever 22 within reach of the operator.

To provide attaching points for side frame members 23 which are adapted to be symmetrically positioned at the sides of the tractor spaced from the body 10 and from the front wheels 14, brackets 24, one of which is visible in Figure 1, are connected by bolts 25 and plates 26 to the rear axle housings of the tractor. The front ends and the frame members 23 are connected to a scoop or shovel arrangement designated in its entirety by the reference character 27. Vertically extending bracket members 28 secured to the side frame members 23 provide means for rotatably carrying a transverse shaft 29 as best shown in Figure 3. At spaced locations on the shaft 29 between the bracket members 28 a pair of bell crank members 30 are mounted for oscillation on the shaft. A plurality of pins 31 extending through openings in the shaft 29 hold the bracket members 28 and the bell crank members 30 against axial movement on the shaft 29.

Each of the bell crank members 30 has a rearwardly and downwardly extending arm 32 formed with a circular bearing face 33 adapted to engage a cam surface 34 formed on a bracket 35 secured to the side of the tractor body at the forward end thereof. It will be understood that one of the brackets 35 is secured at each side of the tractor body. When the shovel or scoop 27 is in lowered position for engaging material to be loaded and lifted the faces 33 of the bell crank 30 are in engagement with the cams 34. Each bell crank member includes a second arm 36 which extends forwardly and upwardly when the loader is in down position as shown in Figure 1. A cable 37 connects a fitting 37' pivoted to each of the arms 36, each cable extending over a pulley 38 mounted above the tractor on a supporting structure including members 39 and 40 rigidly secured to the body 10 of the tractor. Each of said cables further extends over a pulley 41 carried by a hydraulic cylinder 42 and back to a fitting 43 secured to the member 40. It will be understood that this entire structure is duplicated at each side of the tractor, the principles of operation being identical, and the disclosures of one being sufficient to disclose applicant's invention.

A piston 43' mounted in the cylinder 42 is connected to a piston rod 44 which is pivotally connected by a pin 45 to a bracket 46 rigidly secured to the body of the tractor. It will be understood that the pulley arrangement including the pulleys 38 and 41 give a travel of the lifting cable 37 twice the travel of the piston 43' in the cylinder 42. Such an arrangement gives a sufficiently high lift with a cylinder of reasonable length. Such distance amplifying, however, reduces by half force applied on the cable. In order to increase the initial lifting force on the loader the bell crank members 36 have been provided. In the form illustrated the effective length of the arm 37 is approximately twice the effective length of the arm 32. This results in doubling the effective force on the loader during the initial lifting range. As the bell crank member operates with the arm 36 moving to the position shown in Figure 2 the amplifying force is reduced until it reaches a 1 to 1 ratio and exerts a direct lifting force without amplification as the face 33 of the arm 32 leaves the cam 34. The amplifying force is effective for the first few inches of travel, which is the point at which additional power is required to break material used prior to lifting it to an elevated position.

The operation of applicant's tractor loader has been explained in connection with a description of the component parts. It is to be understood that all modifications falling within the scope of the appended claims are included as part of the invention.

What is claimed is:

1. A loader for a tractor adapted to be mounted thereon comprising a frame structure pivoted to the tractor and extending lengthwise alongside one end of the tractor, load carrying structure mounted on said frame structure spaced beyond said end of the tractor, a two arm rockable bell crank member mounted on said structure, abutment means on the tractor adapted to be engaged by one arm of said bell crank member, lifting means supported on the tractor and adapted to be connected to the other arm of said bell crank member, said bell crank being so arranged that during initial movement from the lowered position of the loader frame structure, an amplified lifting force is obtained by action of said bell crank member against the means on the tractor as a fulcrum, said member upon subsequent higher lifting of the loader being arranged and constructed to move into a position to be held against further pivoting with respect to the supporting structure, lifting taking place thereafter without force amplification and with the crank arm being moved with the supporting structure and away from the abutment on the tractor.

2. A loader for a tractor adapted to be mounted thereon comprising a frame structure pivoted at its rear end to the rear end of the tractor and extending lengthwise alongside the tractor, load carrying structure mounted on said frame structure forwardly of the tractor, a two arm rockable bell crank member mounted on said structure, abutment means on the tractor adapted to be engaged by one arm of said bell crank member, lifting means supported on the tractor and adapted to be connected to the other arm of said bell crank member, said bell crank being so arranged that during initial movement from the lowered position of the loader frame structure, an amplified lifting force is obtained by action of said bell crank member against the means on the tractor as a fulcrum, said member upon subsequent higher lifting of the loader being arranged and constructed to move into a position to be held against further pivoting with respect to the supporting structure, lifting taking place thereafter without force amplification and with the crank arm being moved with the supporting structure and away from the abutment on the tractor.

3. A loader for a tractor adapted to be mounted thereon comprising a frame structure pivoted to the tractor and extending lengthwise alongside one end of the tractor, load carrying structure mounted on said frame structure spaced beyond said end of the tractor, a two arm rockable bell crank member mounted on said structure, abutment means on the tractor adapted to be engaged by one arm of said bell crank member, lifting means supported on the tractor and adapted to be connected to the other arm of said bell crank member, said bell crank being so arranged that during initial movement from the lowered position of the loader frame structure, an amplified lifting force is obtained by action of said bell crank member against the means on the tractor as a fulcrum, said member upon subsequent higher lifting of the loader being arranged and constructed to move into a position with its two force applying points in alignment with the direction of the lifting force whereby lifting takes place thereafter without force amplification and with the crank arm being moved away from the abutment on the tractor.

4. A loader for a tractor adapted to be mounted thereon comprising a frame structure pivoted at its rear end to the rear end of the tractor and extending lengthwise alongside the tractor, load carrying structure mounted on said frame structure forwardly of the tractor, a two arm rockable bell crank member mounted on said structure, abutment means on the tractor adapted to be engaged by one arm of said bell crank member, lifting means supported on the tractor and adapted to be connected to the other arm of said bell crank member, said bell crank being so arranged that during initial movement from the lowered position of the loader frame structure, an amplified lifting force is obtained by action of said bell crank member against the means on the tractor as a fulcrum, said member upon subsequent higher lifting of the loader being arranged and constructed to move into a position with its two force applying points in alignment with the direction of the lifting force whereby lifting takes place thereafter without force amplification and with the crank arm being moved away from the abutment on the tractor.

5. A loading device for a tractor comprising a supporting structure mounted at the front end of the tractor and extending thereabove, a pulley mounted at the upper portion of said supporting structure, a loader frame structure pivotally connected at the rear of the structure and extending alongside the tractor beyond the forward end thereof, a material carrying structure on the forward end of said frame structure, a supporting member extending upwardly from said frame structure, a bell-crank member pivoted on said member, said bell-crank member having a rearwardly extending lever arm, an abutment bracket rigidly secured to the tractor body engageable by said rearwardly extending arm during initial lifting of the frame structure of the loader, said bell-crank including a forwardly extending arm, a lifting cable secured to said forwardly extending arm and extending upwardly over the pulley on the supporting structures, and means for applying power to said cable for first pivoting the bell-crank member about the abutment means as a fulcrum and subsequently lifting said member with the supporting bracket on the loader frame when the point of connection of the cable with the lifting arm comes into alignment with the pivot axis of the bell-crank member and the point of first contact of the cable with the pulley.

6. A loading device for a tractor comprising a supporting structure mounted at the front end of the tractor and extending thereabove, laterally spaced pulleys mounted at the upper portion of said supporting structure, a loader frame structure pivotally connected at the rear of the structure and extending alongside the tractor beyond the forward end thereof, a material carrying structure on the forward end of said frame structure, laterally spaced supporting members extending upwardly from said frame structure, bell-crank members pivoted on said supporting member, said bell-crank members having rearwardly extending lever arms, brackets rigidly secured to the tractor body engageable by said rearwardly extending arms during initial lifting of the frame structure of the loader, said bell-cranks including forwardly extending arms, lifting cables secured to said forwardly extending arms, and extending upwardly over the pulleys on the supporting structures, and means for applying power to said cables for first pivoting the bell-crank members and subsequently lifting said members with the supporting brackets on the loader frame when the point of connection of the cable with the lifting arm comes into alignment with the lifting cables.

7. A loading device for a tractor comprising a supporting structure mounted at the front end of the tractor and extending thereabove, laterally spaced pulleys mounted at the upper portion of said supporting structure, a loader frame structure including frame members pivotally connected at the rear of the structure and extending alongside the tractor beyond the forward end thereof, a material carrying structure on the forward end of said frame structure, supporting members extending upwardly from said frame members adjacent the front of the tractor, bell-crank members pivoted on said supporting members, said bell-crank members having rearwardly extending lever arms, brackets rigidly secured to the side of the tractor body adjacent the front end, said brackets engageable by said rearwardly extending arms during initial lifting of the frame structure of the loader, said bell-cranks including forwardly extending arms, lifting cables secured to said forwardly extending arms, and extending upwardly over the pulleys on the supporting structures, and means for applying power to said cables for first pivoting the bell-crank members and subsequently lifting said members with the supporting brackets on the loader frame.

8. A loader for a tractor adapted to be mounted thereon comprising a frame structure pivoted to the tractor on a horizontal axis, load carrying structure mounted on said frame structure, a two arm rockable bell crank member mounted on said structure on a horizontal axis at a point spaced from the axis of the frame structure, abutment means on the tractor adapted to be engaged by one arm of said bell crank member, lifting means supported on the tractor and adapted to be connected to the other arm of said bell crank member, said bell crank being so arranged that during initial movement from the lowered position of the loader frame structure, an amplified lifting force is obtained by action of said bell crank member against the abutment means on the tractor as a fulcrum, said member upon subsequent higher lifting of the loader being arranged and constructed to move into a position to be held against further pivoting with respect to the supporting structure, lifting taking place thereafter without force amplification and with the crank arm being moved with the supporting structure and away from the abutment means on the tractor.

RUSSEL D. ACTON.

REFERENCES CITED

The following references are of record in the file of this patent:

UNITED STATES PATENTS

| Number | Name | Date |
| --- | --- | --- |
| 1,585,863 | Jones | May 25, 1926 |
| 2,286,947 | Bankson | June 16, 1942 |
| 2,313,534 | Gledhill | Mar. 9, 1943 |
| 2,415,892 | Koehl et al. | Feb. 18, 1947 |
| 2,433,086 | Borgelt | Dec. 23, 1947 |

FOREIGN PATENTS

| Number | Country | Date |
| --- | --- | --- |
| 632,708 | Germany | July 13, 1936 |